US007881317B2

(12) United States Patent
Lin (10) Patent No.: US 7,881,317 B2
(45) Date of Patent: Feb. 1, 2011

(54) BORDER/PACKET GATEWAY CONTROL SYSTEM AND CONTROL METHOD

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 598 days.

(21) Appl. No.: 11/680,234

(22) Filed: Feb. 28, 2007

(65) Prior Publication Data

US 2007/0206614 A1 Sep. 6, 2007

Related U.S. Application Data

(63) Continuation of application No. PCT/CN2006/001094, filed on May 25, 2006.

(30) Foreign Application Priority Data

| Jun. 13, 2005 | (CN) | ............... 2005 1 0026714 |
| Jun. 14, 2005 | (CN) | ............... 2005 1 0026736 |
| Jun. 14, 2005 | (CN) | ............... 2005 1 0026737 |

(51) Int. Cl.
*H04L 12/56* (2006.01)

(52) U.S. Cl. ............... 370/401; 370/230; 370/235; 370/252

(58) Field of Classification Search ............... None
See application file for complete search history.

(56) References Cited

U.S. PATENT DOCUMENTS

| 6,708,209 B1 * | 3/2004 | Ebata et al. | ............ 709/223 |
| 6,993,593 B2 * | 1/2006 | Iwata | ............ 709/238 |
| 7,031,747 B2 * | 4/2006 | Cyr et al. | ............ 455/552.1 |
| 7,065,343 B2 * | 6/2006 | Pelaez et al. | ............ 455/412.2 |
| 2002/0051449 A1 * | 5/2002 | Iwata | ............ 370/389 |

(Continued)

FOREIGN PATENT DOCUMENTS

| CN | 1545290 A | 11/2004 |
| CN | 1595887 A | 3/2005 |
| EP | 1418718 A1 | 5/2004 |
| KR | 20020043434 | 6/2002 |

OTHER PUBLICATIONS

"NGN Functional Architecture; Resource and Admission Control Subsystem (RACS); Release 1; Draft ETSI ES 2XX XXX"; ETSI Standards; European Telecommunications Standards Institute; Sophia-Antipo, FR; No. V 150; May 20, 2005; XP014028861; ISSN: 0000-0001.*

(Continued)

*Primary Examiner*—Salman Ahmed
*Assistant Examiner*—Faiyazkhan Ghafoerkhan (57) ABSTRACT

Border/packet gateway control systems and a control method thereof are provided in the embodiments of the invention, the system includes a service control unit, a resource control unit and an interconnecting execution unit. Through schemes of the embodiments of the present invention, the service control information obtained from the service control unit by the interconnecting execution unit in charge of current interconnecting services integrates requirements of three aspects: an IP network interconnecting request, real-time network resource information and control policies of the operator, such that both the user and the operator can obtain satisfying services. According to the schemes of the embodiments of the present invention, in the NGN, highly effective, secure and reliable network interconnecting is realized through effective control on the border/packet gateway based on the network resources and control policies, and NGN network performance is thus improved.

15 Claims, 4 Drawing Sheets

U.S. PATENT DOCUMENTS

| | | | | |
|---|---|---|---|---|
| 2002/0075813 | A1* | 6/2002 | Baldonado et al. | 370/254 |
| 2002/0126678 | A1* | 9/2002 | Kelly et al. | 370/401 |
| 2002/0141378 | A1* | 10/2002 | Bays et al. | 370/351 |
| 2002/0151312 | A1* | 10/2002 | Bos et al. | 455/452 |
| 2003/0027595 | A1* | 2/2003 | Ejzak | 455/560 |
| 2004/0017798 | A1* | 1/2004 | Hurtta et al. | 370/352 |
| 2004/0064541 | A1* | 4/2004 | Ebata et al. | 709/223 |
| 2004/0260784 | A1* | 12/2004 | Lee et al. | 709/217 |
| 2006/0031535 | A1* | 2/2006 | Hackl et al. | 709/228 |
| 2006/0165009 | A1* | 7/2006 | Nguyen et al. | 370/252 |
| 2006/0187910 | A1* | 8/2006 | Franz et al. | 370/389 |
| 2006/0209851 | A1* | 9/2006 | Scudder et al. | 370/401 |
| 2007/0097974 | A1* | 5/2007 | Ward et al. | 370/392 |

OTHER PUBLICATIONS

"General principles and general reference model for next generation networks; Y.2011 (Oct. 2004)"; ITU-T Standard in Force (I); International Telecommunication Union; Geneva, CH; No. Y2011 10/4; Oct. 7, 2004; XP017404392.

ETSI: "TISPAN NGN Functional architecture Release 1"; Draft ETSI ES 2XXX XXX V<1.1.6> Mar. 2005; No. V1.1.6; Mar. 8, 2005; pp. 1-18; XP002463258.

Supplementary European Search Report for European Application No. 06741982.0, dated Jan. 21, 2008.

Chinese Office Action for Chinese Patent Application No. 200680012195.5, dated Sep. 26, 2008, and English translation thereof.

European Office Action for European Patent Application No. 06741982.0, dated Jul. 29, 2009.

European Office Action for European Patent Application No. 06741982.0, dated Feb. 24, 2010.

Translation of Written Opinion for International Application No. PCT/CN2006/001094, dated Sep. 7, 2006.

Chinese Office Action for Chinese Patent Application No. 200680012195.5, dated Mar. 29, 2010, and partial English translation thereof.

* cited by examiner

BORDER/PACKET GATEWAY CONTROL SYSTEM AND CONTROL METHOD

CROSS-REFERENCE TO RELATED APPLICATIONS

This application is a continuation of International Application No. PCT/CN2006/001094 filed on May 25, 2006. This application claims the benefit of Chinese Patent Application Nos. 200510026714.0 filed on Jun. 13, 2005, 200510026737.1 filed on Jun. 14, 2005, and 200510026736.7 filed on Jun. 14, 2005. The disclosures of the above applications are incorporated herein by reference.

FIELD

The present disclosure relates to Next Generation Network (NGN) technology, and more particularly, to border/packet gateway control systems and a control method thereof.

BACKGROUND

The statements in this section merely provide background information related to the present disclosure and may not constitute prior art.

With the development of conventional communication networks, Internet and mobile communication networks, it is an inevitable tendency for various networks to merge with each other. The Next Generation Network (NGN) is a new generation network merging various networks, in which the Internet Protocol (IP) packet switched network serves as the core network, the control and bearer are separated and various access techniques coexist, so as to satisfy demands of future broadband multimedia communications.

The NGN bears all the services of the existing Public Switched Telephone Network (PSTN), meanwhile unloads a great deal of data transport to an IP network so as to reduce the load of the PSTN, and increase and enhance, based on new characteristics of IP technology, many new and old services. The NGN is developed based on the merging of various networks such as the Time Division Multiplexing PSTN voice network, Integrated Services Digital Network (ISDN), IP-based packet network, mobile communication network, and etc. The NGN makes it possible to implement integrated services, such as voice, video, data and the like, in new generation networks.

The NGN is defined by the International Telecommunication Union (ITU) as a packet based network capable of providing telecom services for users and providing various broadband and Quality of Service (QoS) guarantee, wherein service related functions are independent of transport related bottom-layer techniques. The NGN enables a user to freely access networks, competing service providers and services chosen by the providers, and supports general mobility such that the user may receive consistent and common service provision.

Basic characteristics of the NGN include: packet-based transfer; control function separation between bearer ability, call/session and application/service; decoupling of service provision and transport, and providing open interfaces; based on service construction block (including real-time/stream/non-real-time services and multimedia) to support wide-area services, applications and mechanisms; end-to-end QoS and transparent broadband ability; interacting with conventional networks through the open interfaces; universal mobility; free access for a user to different service providers; diversified identification scheme that may be resolved to an IP address to route in an IP network; sensing by the user that one service possesses uniform service characteristics; merging services between fixed and mobile networks; service-related functions independent of bottom-layer transport techniques; supporting various last mile techniques; adapted to all control requirements, such as urgent communications, security/privacy, and etc.

Figure 1:
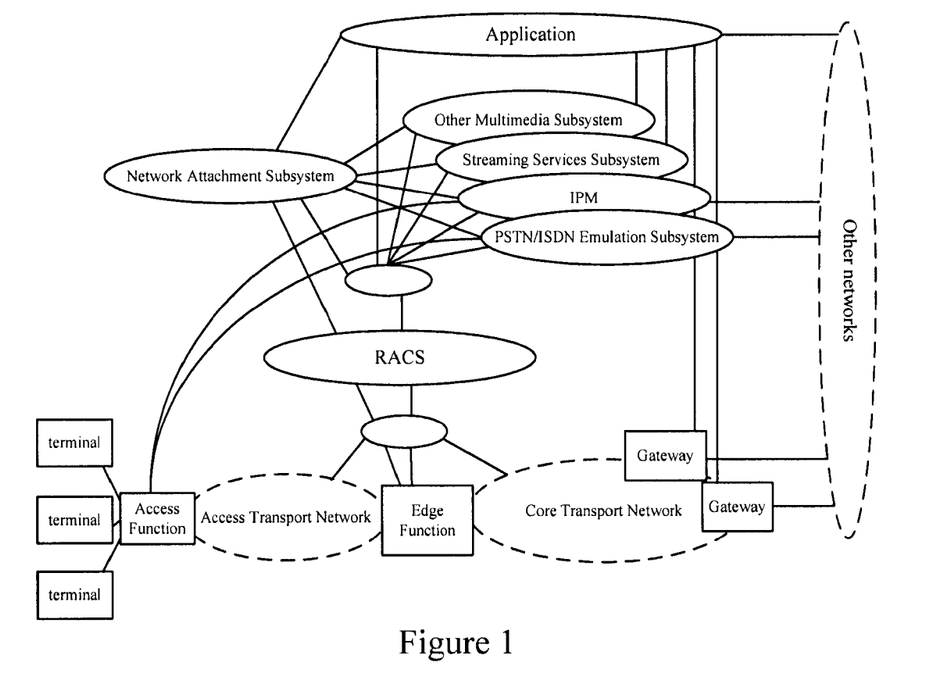
FIG. 1 is a logic block diagram illustrating the system architecture of an NGN.

FIG. 1 is a logic block diagram illustrating the architecture of an NGN system. As shown in FIG. 1, the NGN includes a Network Attachment Subsystem, a Resource and Admission Control Subsystem (RACS), a PSTN/ISDN Emulation Subsystem, an IP Multimedia Subsystem (IMS), a Streaming Services Subsystem and other Multimedia Subsystem.

The IP bearer network includes a Core Transport Network and an Access Transport Network. A terminal accesses the IP bearer network through an Access Function; different IP transport networks interconnect with each other through an Edge Function, for example, between the Access Transport Network and the Core Transport Network, or between different domains of the Core Transport Network; and the Core Transport Network interconnects, through a gateway, with other networks such as a conventional fixed or mobile network.

The RACS is in charge of uniform management of bearer network resources. The RACS includes a Policy Decision Function Entity (PDFE) for arbitrating, based on the status of network resources and a preset control policy, a service decision on security, resources, media and the like related to IP network interconnecting. It further includes a Transport Resource Control Function Entity (TRCFE) for managing the IP network resources of itself.

Because of demands of user service transport, it is necessary to interconnect between different IP networks, e.g., between the Access Transport Network and the Core Transport Network, or between different domains of the Core Transport Network. Therefore, a function entity located in an interconnecting node, namely Border Gateway Function Entity/Packet Gateway Function Entity (BGFE/PGFE), may also include such functions as security protection, resource guarantee, and media processing. However, when a Border Gateway Control Function Entity/Packet Gateway Control Function Entity (BGCFE/PGCFE) initiates a request for IP network interconnecting services, there has been so far no definite and effective method and system for controlling the BGFE/PGFE according to the status of network resources and the policy of the operator to implement network interconnecting.

The inventor of the present invention found in the inventing process that, with further evolvement of the NGN and emergence of various related standards, how to solve the problem of effective border/packet gateway control has become one of the key techniques for developing the NGN. However, no technical schemes can effectively solve the problem at present, that is to say, it is yet impossible to control the BGFE/PGFE in various aspects according to the status of network resources and the policy of the operator so as to implement network interconnecting. As a result, further development and evolvement of the NGN is severely hampered.

SUMMARY

In one aspect, the embodiments of the present invention provide border/packet gateway control systems, which can implement network interconnecting through control based on network resources and preset control policies.

In another aspect, the embodiments of the present invention provide a method for implementing control by a border/packet gateway control system, which enables a border/packet gateway of the Next Generation Network (NGN) to implement network interconnecting under control based on network resources and preset control policies.

A border/packet gateway control system includes:

a service control unit, configured for sending a resource request, receiving network resource information, and sending service control information;

a resource control unit, configured for receiving the resource request from the service control unit, sending the network resource information to the service control unit; and an interconnecting execution unit, configured for receiving the service control information from the service control unit, and performing Internet Protocol (IP) network interconnecting.

A method for implementing control by a border/packet gateway control system includes:

setting a control policy in the border/packet gateway control system for controlling bearer resources;

obtaining network resource information, generating a service decision related to IP network interconnecting according to the control policy and the network resource information;

performing IP network interconnecting according to the service decision.

A border/packet gateway control system, includes:

a Border Gateway Control Function Entity/Packet Gateway Control Function Entity (BGCFE/PGCFE), configured for providing control of IP network interconnecting services from the application level, sending an IP network interconnecting request and service control information;

a Policy Decision Function Entity (PDFE), configured for receiving the IP network interconnecting request and the service control information from the BGCFE/PGCFE, sending a resource request, receiving network resource information, and sending the service control information;

a Transport Resource Control Function Entity (TRCFE), configured for receiving the resource request from the PDFE, sending the network resource information to the PDFE; and a Border Gateway Function Entity/Packet Gateway Function Entity (BGFE/PGFE), configured for receiving the service control information from the PDFE, and performing IP network interconnecting.

Another border/packet gateway control system, includes:

a BGCFE/PGCFE, configured for providing control of the IP network interconnecting services from the application level, sending an IP network interconnecting request and a decision request; receiving a service decision; adjusting and sending service control information;

a PDFE, configured for receiving the IP network interconnecting request and the decision request from the BGCFE/PGCFE sending a resource request, receiving network resource information; generating the service decision and sending the service decision to the BGCFE/PGCFE;

a TRCFE, configured for receiving the resource request from the PDFE, sending the network resource information to the PDFE; and a BGFE/PGFE, configured for receiving the service control information from the PDFE, and performing IP network interconnecting.

A BGCFE/PGCFE, includes:

a unit for providing control of IP network interconnecting services from the application level, sending an IP network interconnecting request and service control information to a PDFE.

Another BGCFE/PGCFE, includes:

a unit for providing control of the IP network interconnecting services from the application level, sending an IP network interconnecting request and a decision request to a PDFE; receiving a service decision from the PDFE; adjusting and sending the service control information to a BGFE/PGFE.

A PDFE, includes:

a unit for receiving an IP network interconnecting request and service control information from a BGCFE/PGCFE, sending a resource request to a TRCFE, receiving network resource information from the TRCFE, and sending directly or after adjusting the service control information to a BGFE/PGFE.

Another PDFE, includes:

a unit for receiving an IP network interconnecting request and decision request from a BGCFE/PGCFE; sending a resource request to a TRCFE, receiving network resource information from the TRCFE; generating a service decision and sending the service decision to the BGCFE/PGCFE.

It can be seen from the above technical schemes that, through the border/packet gateway control system and control method of the embodiment of the present invention, the service control information obtained from the service control unit by the interconnecting execution unit in charge of current interconnecting services integrates the requirements of three aspects: an IP network interconnecting request, real-time network resource information and control policies of the operator, such that both the user and the operator can obtain satisfying services. According to the schemes of the embodiments of the present invention, in the NGN, highly effective, secure and reliable network interconnecting is realized through effective control on the border/packet gateway based on the network resources and control policies, and NGN network performance is thus improved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
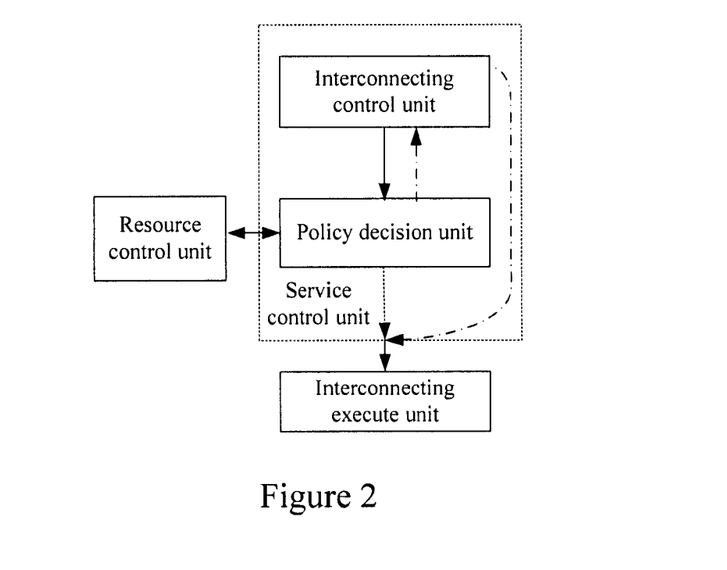
FIG. 2 is a block diagram illustrating the composition of a border/packet gateway control system in accordance with an embodiment of the present invention.

FIG. 2 is a block diagram illustrating the border/packet gateway control system in accordance with an embodiment of the present invention. As shown in FIG. 2, the border/packet gateway control system includes: a service control unit, a resource control unit and an interconnecting execution unit.

The service control unit, when initiating an IP network interconnecting request and service control, sends a resource request to the resource control unit, receives network resource information from the resource control unit, and generates, according to the received network resource information and control policies preset to control bearer resources based on service demands in the service control unit, a service decision on security, resources, media and the like related to the IP network interconnecting service. Then, the service control unit further adjusts the service control information according to the generated service decision, and sends the adjusted service control information to the interconnecting execution unit. The control policies are preset in a Policy Decision Function Entity (PDFE) by the operator according to the operation demands, for example, specify a bandwidth limit for services of a certain type, or set an address translation rule when Network Address Translation (NAT) is carried out, or the like.

The resource control unit receives the resource request from the service control unit, and feeds back the network resource information to the service control unit. The resource control unit may be a Transport Resource Control Function Entity (TRCFE) in a Resource and Admission Control Subsystem (RACS).

The interconnecting execution unit receives the service control information from the service control unit, and performs IP network interconnecting according to the received service control information. The interconnecting execution unit may be a BGFE/PGFE.

Through the border/packet gateway control system and control method, the service control information obtained from the service control unit by the interconnecting execution unit in charge of current interconnecting services integrates requirements of three aspects: an IP network interconnecting request, real-time network resource information and control policies of the operator, such that both the user and the operator can obtain satisfying services. According to the schemes of the embodiment, in the NGN, high-effective, secure and reliable network interconnecting is realized through effective control on the border/packet gateway according to the network resources and control policies, and NGN performance is thus improved.

Further more, the service control unit may include an interconnecting control unit and a policy decision unit. The interconnecting control unit may be a BGCFE/PGCFE, and the policy decision unit may be a PDFE in the RACS.

To make the technical schemes and advantages clearer, the present invention is further described in detail with reference to attached drawings and preferred embodiments.

Figure 3:
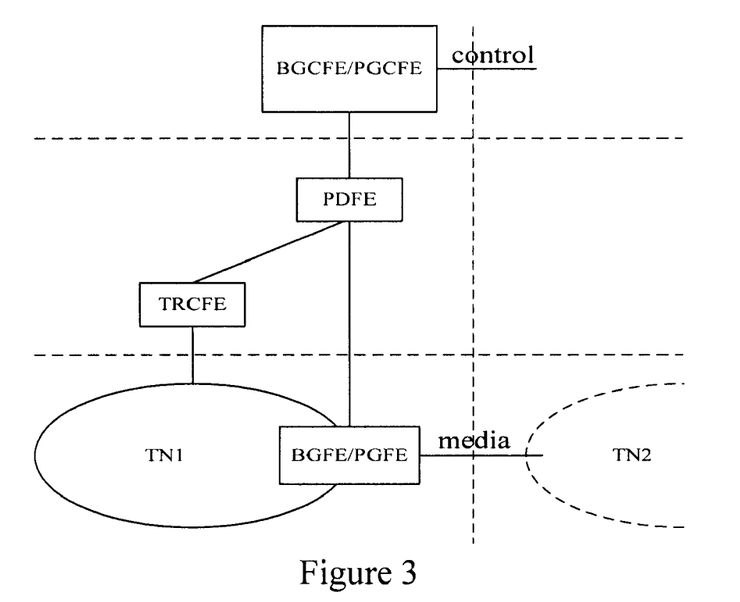
FIG. 3 is a block diagram illustrating the composition of a border/packet gateway control system in accordance with a first embodiment of the present invention.

FIG. 3 is a block diagram illustrating the composition of a border/packet gateway control system in accordance with a first embodiment of the present invention. In FIG. 3, the BGCFE/PGCFE is an interconnecting control unit, the PDFE is a policy decision unit, the TRCFE is a resource control unit, and the BGFE/PGFE is an interconnecting execution unit. The TRCFE and PDFE belong to the RACS. In conjunction with FIG. 2, in this embodiment, the PDFE is connected with the BGFE/PGFE through a dashed arrow while the stipple arrow is invalid. Functions of the above units will be hereinafter described respectively.

The BGFE/PGFE is located in a certain Transport Network (TN) such as TN1 shown in FIG. 3, and connected with an interface node of other TNs such as TN2 shown in FIG. 3. After receiving the IP network interconnecting service control from the PDFE, the BGFE/PGFE implements such gateway functions as security protection, resource guarantee, media processing and so forth, and accomplishes the IP network interconnecting.

The BGCFE/PGCFE is used to control IP network interconnecting services from the application level, send a resource request of IP network interconnecting and service control information to the PDFE.

The service control information may include, Network Address Translation (NAT) allocating and traversing, interconnecting between IPv4 and IPv6, anti-address-cheating, topology hiding, packet flags, gating such as packet filtering, resource allocation and bandwidth reservation, flow control, use measuring, media coding/decoding algorithm, and conversion of packing period of time.

The TRCFE is in charge of managing IP network resources, receiving a resource request from the PDFE and feeding back real-time network resource information to the PDFE.

The PDFE mainly includes two functions. One is to act as a proxy between the BGCFE/PGCFE and the BGFE/PGFE; the other is to be in charge of service decision related to IP network interconnecting, such as security, resources, media and the like. More specifically, after receiving the IP network interconnecting request and service control information from the BGCFE/PGCFE, the PDFE sends a resource request to the TRCFE, and generates a service decision according to network resource information fed back from the TRCFE and control policies preset in the PDFE. Then, the PDFE adjusts, according to the generated service decision, the received service control information; and sends the adjusted service control information to the BGFE/PGFE. The adjusting includes modifying and/or complementing, etc. Refer to descriptions of the method in FIG. 4 for specific implementation.

As shown in FIG. 3, the service control information obtained from the PDFE by the interconnecting execution unit in charge of providing current interconnecting services integrates requirements of three aspects: a request of the BGCFE/PGCFE, real-time network resource information and control policies of the operator, such that both the user and the operator can obtain satisfying services.

In the first embodiment, through adding the PDFE as a proxy between the BGCFE/PGCFE and the BGFE/PGFE, control and management of the BGFE/PGFE are thus realized. Control on the BGFE/PGFE by the BGCFE/PGCFE is implemented by the PDFE, and resource capacity of the PDFE is about equal to a sum of resource capacities of all the BGFE/PGFEs managed by the PDFE. Therefore, the BGCFE/PGCFE may control the PDFE as if it is a BGFE/PGFE, thus requesting the PDFE for services is similar to requesting the BGFE/PGFE for the services. The PDFE is logically analogous to a BGFE/PGFE with multiple BGFE/PGFE resources, which sharply reduces amounts of network elements needing to be managed by the BGCFE/PGCFE as well as burden of the BGCFE/PGCFE.

Meanwhile, the PDFE is also analogous to the BGCFE/PGCFE. The BGFE/PGFE registers in the PDFE uniformly, while the PDFE, as a BGFE/PGFE, registers in the BGCFE/PGCFE. As long as one BGFE/PGFE succeeds in registering in the PDFE, the PDFE is able to provide services for the BGCFE/PGCFE.

Besides, in order to keep consistency of call models of the BGCFE/PGCFE and BGFE/PGFE, mapping relationships between the call models of BGCFE/PGCFE and the call models of BGFE/PGFE may be further established in the PDFE, such as the mapping relationships of call identities, resource identities, topologies, control messages and the like.

Figure 4:
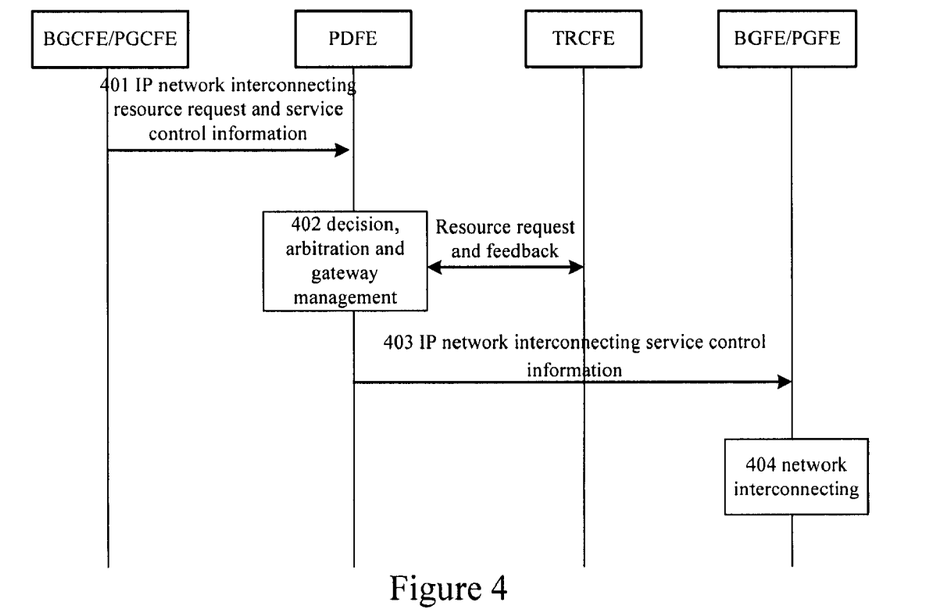
FIG. 4 is a flowchart of a border/packet gateway control method in accordance with the first embodiment of the present invention.

FIG. 4 is a flowchart illustrating the border/packet gateway control method in accordance with the first embodiment of the present invention. The method of the first embodiment of the present invention will be hereinafter described with reference to FIG. 3.

Step 401: the BGCFE/PGCFE sends a resource request of IP network interconnecting and service control information related to IP network interconnecting to request the BGFE/PGFE to allocate appropriate resources or to initiate the corresponding mechanism for providing IP network interconnecting services, the resource request includes such information as the source address, destination address and QoS requirements.

Step 402: after receiving the resource request of IP network interconnecting and the service control information, the PDFE requests the TRCFE to allocate the appropriate network resources, and generates, according to network resource information fed back by the TRCFE and control policies preset in the PDFE, a service decision; the PDFE adjusts, according to the generated service decision, the received service control information to carry out gateway management; then the PDFE converts the call model of the BGCFE/PGCFE to that of the chosen BGFE/PGFE according to the preset mapping relationships of call models.

In this step, the network resource information fed back by the TRCFE includes, network bandwidth, delay and jitter. An example for illustrating the method of generating the service decision is described herein. Suppose that the BGCFE/PGCFE requests for 2M bandwidth for a certain service, the PDFE determines, according to feedback of the TRCFE, that the current network could only provide resources with 1M bandwidth; if the preset control policy is that the service is provided according to the actual resources instead of being refused in the case of bandwidth shortage, the service decision is to provide 1M bandwidth; otherwise, if the preset control policy is that the service is refused in the case of bandwidth shortage, the service decision is to refuse the service. For another example, suppose that the BGCFE/PGCFE requests for 2M bandwidth for a certain service, the PDFE determines, according to feedback of the TRCFE, that the current network could provide resources with 5M bandwidth; if the preset control policy is that the service is provided according to the actual resources in the case that there is sufficient bandwidth, the service decision is to provide 5M bandwidth; if the preset control policy is that the service is provided according to the requested resources in the case that there is sufficient bandwidth, the service decision is to provide 2M bandwidth. Concluded from the above, the principle of generating the service decision is that, according to the preset control policy, the service decision is to provide the requested resources or the actual resources when the actual resources are more than the requested resources, while the service decision is to provide the actual resource or to refuse the service when the actual resources are less than the requested resources.

Gateway management implemented by the PDFE includes: adjusting the received service control information in Step 401 according to the decision; choosing and controlling the BGFE/PGFE to allocate appropriate resources or initiate the corresponding mechanism for providing the current network interconnecting services, for example, if the above service decision is to provide 1M bandwidth, the PDFE chooses a BGFE/PGFE with the resource provision ability, then controls the BGFE/PGFE to allocate 1M bandwidth for the current service.

The preset mapping relationships includes, mapping relationships of call identities, resource identities, topologies and control messages.

Implementing modification of adjusting is further illustrated by examples. For instance, the BGCFE/PGCFE generates, according to session negotiation, a resource request of IP network interconnecting and service control information which contains the information of allocating 2M bandwidth. However, the PDFE, based on the current network resources and control policy, can only provide the service with 1M bandwidth at most, the PDFE will modify originally requested 2M bandwidth in the service control to 1M bandwidth if the BGCFE/PGCFE and the PDFE accept the service with 1M bandwidth through negotiation. The negotiating procedure is not always a must, negotiating means that the PDFE sends the generated service decision to the BGCFE/PGCFE which is a resource requester and the decision will be accepted if the PDFE receives an acknowledgement from the BGCFE/PGCFE; otherwise, not accepted. If not accepted, the PDFE may again request the TRCFE for network resources, generate the service decision and adjust the service control information once more; or the PDFE may directly terminate this requesting procedure as a failure.

In another example, the BGCFE/PGCFE generates, according to the session negotiation, a resource request of IP network interconnecting and service control information which contains the information of creating a path, wherein the coding may either be G.721 coding with higher fidelity but occupying more bandwidth or G.729 coding with lower fidelity but occupying less bandwidth. If the PDFE finds through the network resource information fed back by the TRCFE, that the network has already been relatively congested, e.g., the currently used bandwidth exceeds a certain proportion of the total bandwidth, the preferred service decision made by the PDFE based on the current network resource and control policy is to choose the G.729 coding, and the decision information is carried in the service control information sent to the BGFE/PGFE.

Another example is given here to illustrate implementing of complement which is a way of adjusting. With respect to a media stream to cross different IP-domains, the PDFE makes a service decision that NAT is necessary based on the considerations in the aspect of security, such as topology hiding, or considerations in the aspect of resource, such as different address formats, and according to the decision, notifies, in the service control information sent to the BGFE/PGFE, the chosen BGFE/PGFE to carry out related configuration of NAT allocating and traversing.

Step 403: the PDFE sends the adjusted service control information of IP network interconnecting to the chosen BGFE/PGFE.

Step 404: the BGFE/PGFE, according to requirements in the control information, performs IP network interconnecting so as to realize the IP network interconnecting.

Figure 5:
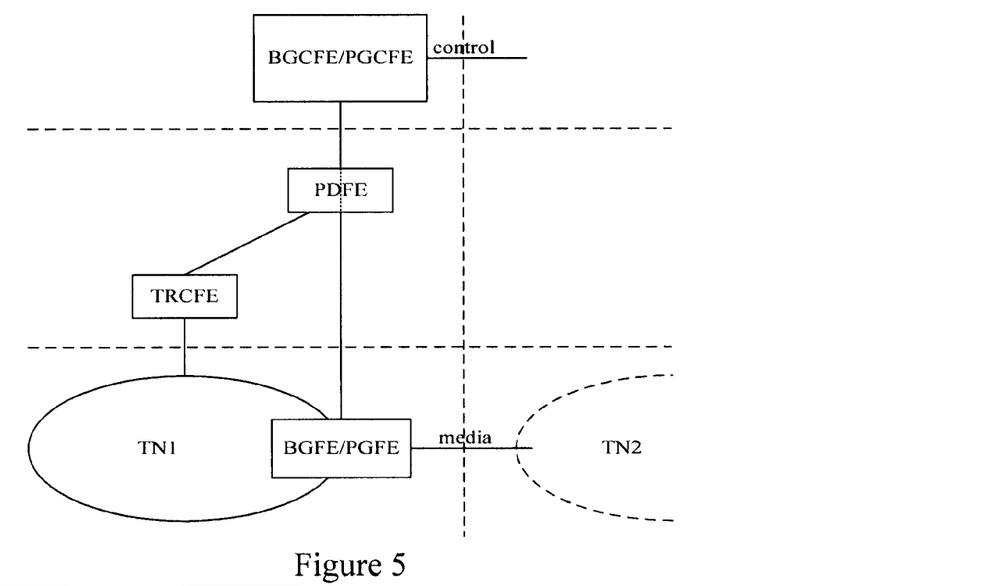
FIG. 5 is a block diagram illustrating the composition of a border/packet gateway control system in accordance with a second embodiment of the present invention.

FIG. 5 is a block diagram illustrating a border/packet gateway control system in accordance with a second embodiment of the present invention. In FIG. 5, the BGCFE/PGCFE is an interconnecting control unit, the PDFE is a policy decision unit, the TRCFE is a resource control unit, and the BGFE/PGFE is an interconnecting execution unit. The TRCFE and the PDFE belong to the RACS. Combined with FIG. 2, in this embodiment, the PDFE is connected with the BGFE/PGFE through a dashed arrow while connection through a stipple arrow is invalid. Functions of the above units will be hereinafter described respectively.

The BGFE/PGFE is located in a certain Transport Network (TN) such as TN1 shown in FIG. 5, connected with an interface node of other TNs such as TN2 shown in FIG. 5. After receiving IP network interconnecting service control from the PDFE, the BGFE/PGFE implements such gateway functions as security protection, resource guarantee, media processing and so forth, and accomplishes the IP network interconnecting.

The BGCFE/PGCFE controls the BGFE/PGFE from the application level. The BGFE/PGFE registers in the BGCFE/PGCFE via the PDFE, and the BGCFE/PGCFE then obtains resource status of the BGFE/PGFE and sends service control information to the BGFE/PGFE via the PDFE. The BGCFE/PGCFE sends an IP network interconnecting request to the PDFE, and sends the service control information via the PDFE.

The TRCFE is in charge of managing IP network resources, receiving a resource request from the PDFE, and feeding back real-time network resource information to the PDFE.

The PDFE functions as a Proxy to forward the service control information from the BGCFE/PGCFE to the corresponding BGFE/PGFE, meanwhile provides the service decision related to IP network interconnecting. When necessary, the PDFE will adjust the service control information to be forwarded according to the service decision. Specifically, the process includes:

after receiving the IP network interconnecting request and service control information, the PDFE, on one hand, sends a resource request to the TRCFE and generates a service decision according to network resource information fed back by the TRCFE and control policies preset by the PDFE;

on the other hand, the PDFE, when forwarding the service control information from the BGCFE/PGCFE to the BGFE/PGFE, will adjust the service control information to be forwarded based on the generated service decision, such that it complements and/or modifies the service control information sent from the BGCFE/PGCFE to the designated BGFE/PGFE, such as security protection, resource guarantee, media processing and the like, related to the IP network interconnecting.

It should be noted that adjusting the service control information by the PDFE is implemented only when necessary, and whether or not the adjusting is necessary is decided by the PDFE according to the current service decision and requirements in the service control information. If the resources provided by current service decision can meet the requirements, the adjusting is not implemented; if the resources can not meet the requirements, the adjusting should be implemented, furthermore, whether or not to implement the final adjusting also depends on a result of negotiation between the PDFE and requester.

The PDFE provides a uniform interface for the controlling interaction between the BGCFE/PGCFE and the BGFE/PGFE. Through the interface, the BGFE/PGFE registers in the BGCFE/PGCFE, and the BGCFE/PGCFE obtains the resource status of the BGFE/PGFE, and thus controls the BGFE/PGFE via the PDFE. Call models of the BGCFE/PGCFE and the BGFE/PGFE are kept consistent.

Compare the second embodiment with the first embodiment, in the first embodiment, the BGCFE/PGCFE carries out information interaction with the PDFE, and controls the BGFE/PGFE chosen by the PDFE after the PDFE acts as a proxy and makes a decision; while, in the second embodiment, the BGCFE/PGCFE chooses a BGFE/PGFE by itself according to registration information of the BGFE/PGFEs, and forwards the service control information to the chosen BGFE/PGFE via the PDFE, meanwhile, if necessary, the PDFE will adjust, according the service decision generated by itself, the service control information to be forwarded before forwarding it.

Figure 6:
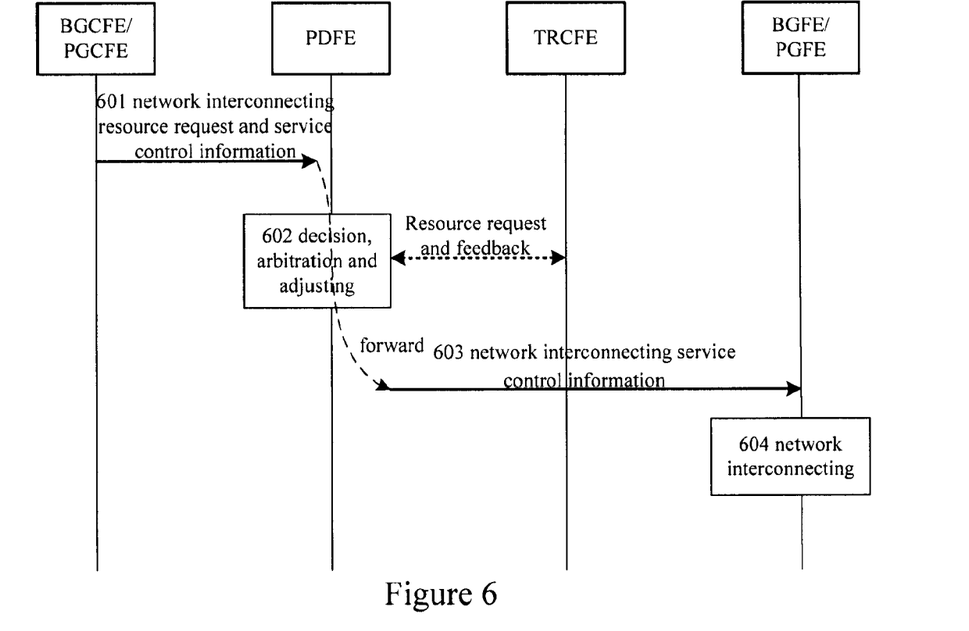
FIG. 6 is a flowchart illustrating a border/packet gateway control method in accordance with the second embodiment of the present invention.

FIG. 6 is a flowchart illustrating a border/packet gateway control method in accordance with the second embodiment of the present invention. The method in accordance with the second embodiment of the present invention will be hereinafter described with reference to FIG. 5.

Step 601: the BGCFE/PGCFE sends a resource request of IP network interconnecting to the PDFE, and sends service control information to the BGFE/PGFE via the PDFE so as to request the BGFE/PGFE to allocate appropriate resources or initiate the corresponding mechanism for providing IP network interconnecting services.

The service control information contains information of the chosen BGFE/PGFE.

Step 602: after receiving the resource request of IP network interconnecting and the service control information to be forwarded, the PDFE requests the TRCFE to allocate appropriate network resources, and implements, based on the control policy preset in the PDFE, corresponding arbitration to generate a service decision according to the network resource information fed back by the TRCFE such as network bandwidth, delay, jitter and the like; the PDFE then implements, according to the generated service decision, corresponding adjusting for the service control information of IP network interconnecting to be forwarded, such as complementing and/or modifying the information, etc.

The adjusting method is the same as that described in Step 402 of the first embodiment, so there are no more descriptions. It should be noted that the adjusting is implemented only if it is needed according to the current decision; otherwise, the service control information is forwarded directly.

Step 603: the PDFE forwards the service control information of IP network interconnecting after the processing in Step 602 to the chosen BGFE/PGFE.

Step 604: the BGFE/PGFE performs, according to the requirements in the received service control information, IP network interconnecting to realize the IP network interconnecting.

In the second embodiment, the BGCFE/PGCFE forwards the service control information of IP network interconnecting to the BGFE/PGFE via the PDFE, and the PDFE makes arbitration according to the network resource status provided by the TRCFE and the preset control policy so as to obtain the decision related to IP network interconnecting, the PDFE adjusts, according to the decision, the service control information to be forwarded and then forwards it to the BGFE/PGFE for implementation.

Similarly, the adjusted service control information integrates the user service demands, i.e., the requirements in the service control information sent by the BGCFE/PGCFE, real-time network resource information and control policies of the operator, which enables the users and the operator to obtain a satisfying service.

Figure 7:
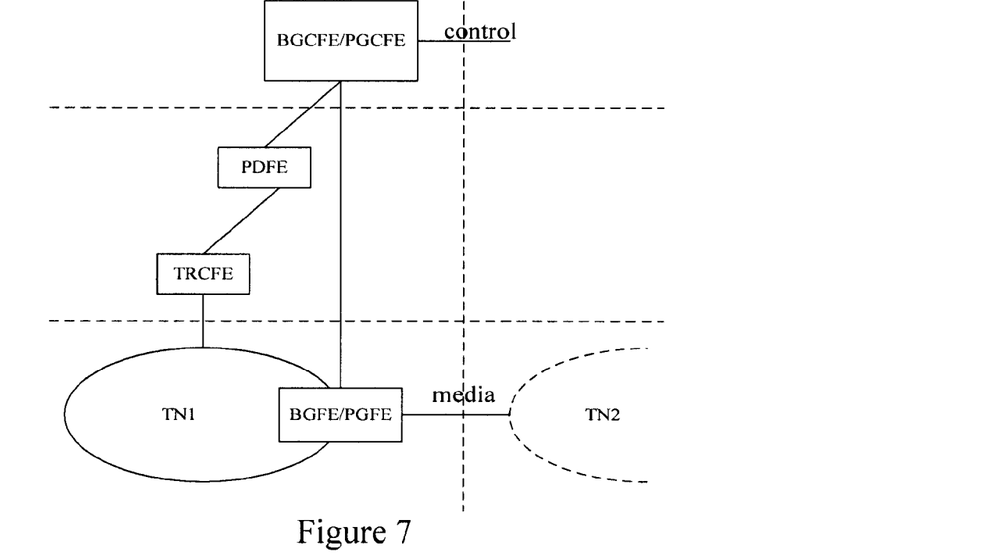
FIG. 7 is a block diagram illustrating the composition of a border/packet gateway control system in accordance with a third embodiment of the present invention.

FIG. 7 is a block diagram illustrating the composition of a border/packet gateway control system in accordance with a third embodiment of the present invention. In FIG. 7, the BGCFE/PGCFE is an interconnecting control unit, the PDFE is a policy decision unit, the TRCFE is a resource control unit, and the BGFE/PGFE is an interconnecting execution unit. The TRCFE and the PDFE belong to the RACS. Combined with FIG. 2, in this embodiment, the BGCFE/PGCFE in the service control unit is connected with the BGFE/PGFE through a dashed arrow, and the PDFE sends information to the BGCFE/PGCFE through the dashed arrow, while connection through a stipple arrow is invalid. Functions of the above units will be hereinafter described respectively.

The BGFE/PGFE is located in a certain TN such as TN1 shown in FIG. 7, and connected with an interface node of other TNs such as TN2 shown in FIG. 7. After receiving IP network interconnecting service control from the PDFE, the BGFE/PGFE implements such gateway functions as security protection, resource guarantee, media processing and so forth, and accomplishes the IP network interconnecting.

The TRCFE is in charge of managing IP network resources, receiving a resource request from the PDFE, and feeding back real-time network resource information to the PDFE.

After receiving an IP network interconnecting request and decision request from the BGCFE/PGCFE, the PDFE sends a resource request to the TRCFE, generates, according to the network resource information fed back by the TRCFE and the control policy preset in the PDFE, a service decision, and returns the generated service decision to the BGCFE/PGCFE that has initiated the IP network interconnecting request and decision request.

The BGCFE/PGCFE controls the BGFE/PGFE from the application level. Interaction between the BGCFE/PGCF and the BGFE/PGFE is in the direct interface mode, the BGFE/PGFE registers in the BGCFE/PGCFE, and the BGCFE/PGCFE then obtains resource status of the BGFE/PGFE and controls the BGFE/PGFE directly. Call modes of the BGCFE/PGCFE and the BGFE/PGFE are kept consistent.

The BGCFE/PGCFE sends to the PDFE the IP network interconnecting request and decision request, adjusts, after receiving the service decision returned by the PDFE, the service control information to be sent to the BGCFE/PGCFE according to the received service decision, so as to complement and/or modify the service control information sent from the BGCFE/PGCFE to the designated BGFE/PGFE, such as security protection, resource guarantee, media processing and the like, related to the IP network interconnecting.

In the third embodiment, the BGCFE/PGCFE controls the BGFE/PGFE directly, and obtains the decision information through interacting with the PDFE to realize effective control on the BGFE/PGFE. The BGCFE/PGCFE controls the BGFE/PGFE directly, in theory, the BGCFE/PGCFE is essentially designed to control the BGFE/PGFE, if the BGCFE/PGCFE has obtained the decision information from the PDFE before implementing control, it is possible to directly provide control adapted to actual situation from the very beginning without modifying the control during control procedure. As a result, implementing the control functions is relatively simple.

Figure 8:
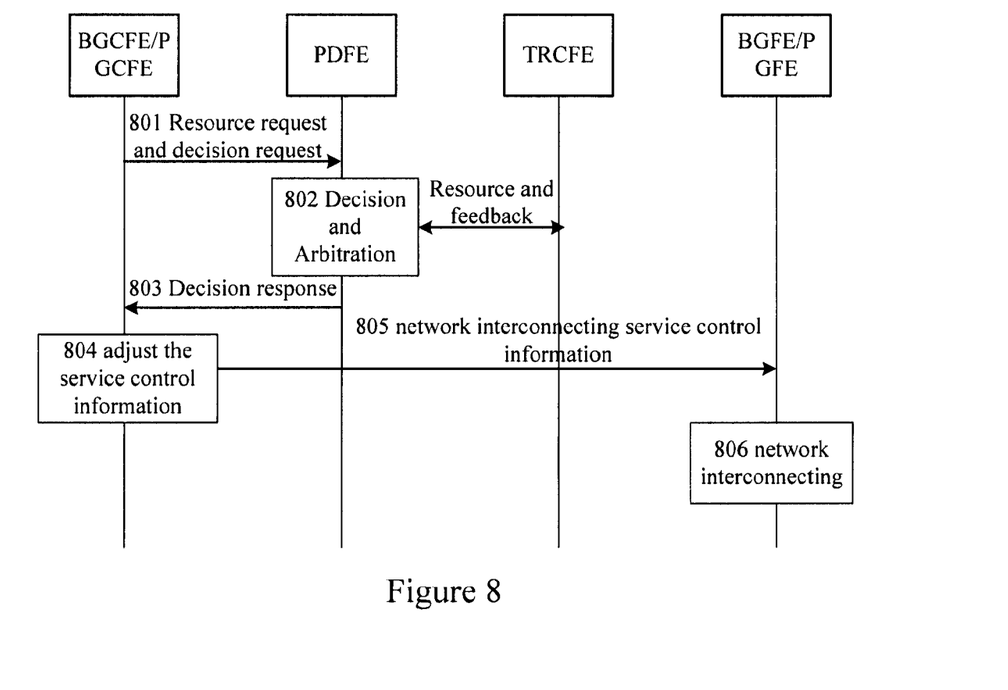
FIG. 8 is a flowchart illustrating a border/packet gateway control method in accordance with the third embodiment of the present invention.

FIG. 8 is a flowchart illustrating a border/packet gateway control method in accordance with the third embodiment of the present invention. The method will be described hereinafter with reference to FIG. 7.

Step 801: the BGCFE/PGCFE sends a resource request and a decision request related to IP network interconnecting to the PDFE, and requests for a decision response, so as to request the PDFE to allocate IP network resources and generate a service decision.

The resource request and decision request contain information related to the BGFE/PGFE, such as an IP address and the like, which are generally sent when bearer layer resources are applied for after/during the process in which the session layer creates a session.

Step 802~Step 803: after receiving the resource request and decision request related to IP network interconnecting, the PDFE requests the TRCFE to allocate appropriate network resources; according to network resource information fed back by the TRCFE such as network bandwidth, delay, jitter and the like, the PDFE implements corresponding arbitration based on control policies preset in the PDFE to generate a service decision, then returns the decision to the BGCFE/PGCFE.

Step 804: the BGCFE/PGCFE implements, according to the received service decision information, corresponding adjusting for the service control information of IP network interconnecting, such as complementing and/or modifying the information.

The adjusting method is the same as that described in Step 402 of the first embodiment, so there are no more descriptions. It should be noted that the adjusting is implemented only if it is needed according to the current decision; otherwise, the service control information is forwarded directly.

Step 805~Step 806: the BGCFE/PGCFE sends the service control information of IP network interconnecting to the BGFE/PGFE, the BGFE/PGFE then performs IP network interconnecting according to the requirements in the service control information so that the IP network interconnecting is realized.

In addition, to increase operation efficiency, an interface may be set between the PDFE and the BGFE/PGFE, therefore, the service decisions about security, resource, media and the like made by the PDFE according to the resource status and control policy may be partially implemented via the interface by the BGFE/PGFE directly controlled by the PDFE, rather than totally returned to the BGCFE/PGCFE to be implemented by the BGFE/PGFE controlled by the BGCFE/PGCFE. Similar to a combined mode of the first embodiment and second embodiment, the specific implementation is as follows:

The decision request sent by the BGCFE/PGCFE to the PDFE contains information of the chosen BGFE/PGFE; the PDFE adjusts the service control information according to part of the generated service decisions and sends the adjusted service control information to the BGFE/PGFE chosen by the BGCFE/PGCFE; meanwhile, the PDFE sends the rest of the generated service decisions to the BGCFE/PGCFE, and the BGCFE/PGCFE adjusts the service control information according to the received service decisions and sends it to the chosen BGFE/PGFE; the chosen BGFE/PGFE performs IP network interconnecting according to the adjusted service control information.

Alternatively, the decision request sent by the BGCFE/PGCFE to the PDFE may not contain information of the chosen BGFE/PGFE, the PDFE adjusts the service control information according to part of the generated service decisions, chooses a BGFE/PGFE, and sends the adjusted service control information to the chosen BGFE/PGFE; meanwhile, the PDFE sends the rest of the generated service decisions and information of the chosen BGFE/PGFE to the BGCFE/PGCFE, and the BGCFE/PGCFE adjusts the service control information according to the received service decisions and sends it to the chosen BGFE/PGFE; the chosen BGFE/PGFE performs IP network interconnecting according to the adjusted service control information.

The foregoing is only preferred embodiments of the present invention and is not for use in limiting protection scope thereof. Any change or substitution, within the technical scope of the present disclosure, easily occurring to those skilled in the art should be covered in the protection scope thereof.

What is claimed is:

1. A method for implementing control by a border/packet gateway control system, comprising:

setting a control policy in the border/packet gateway control system for controlling bearer resources;

obtaining network resource information, generating a service decision related to IP network interconnecting according to the control policy and the network resource information, wherein the control policy comprises operation demands from an operator;

performing IP network interconnecting according to the service decision;

wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);

said obtaining network resource information and generating the service decision according to the control policy and the network resource information comprises:

sending, by the BGCFE/PGCFE, a resource request of the IP network interconnecting to the PDFE;

requesting, by the PDFE, the TRCFE to allocate appropriate network resources;

feeding back, by the TRCFE, the network resource information to the PDFE;

generating, by the PDFE, the service decision related to IP network interconnecting services according to the control policy and the network resource information;

said sending the resource request of the IP network interconnecting to the PDFE comprises:

sending, by the BGCFE/PGCFE, service control information related to IP network interconnecting to the PDFE;

and said performing IP network interconnecting according to the service decision comprises:

adjusting, by the PDFE, the service control information according to the service decision;

choosing, by the PDFE, a BGFE/PGFE and sending the adjusted service control information to the BGFE/PGFE;

performing, by the BGFE/PGFE, IP network interconnecting according to the adjusted service control information.

2. The method of claim 1, further comprising:

before sending the adjusted service control information to the BGFE/PGFE, sending, by the PDFE, the adjusted service control information to the BGCFE/PGCFE;

proceeding to implement said sending if the PDFE receives an acknowledgement from the BGCFE/PGCFE; otherwise, re-requesting, by the PDFE, the TRCFE to allocate appropriate network resources; feeding back, by the TRCFE, the network resource information to the PDFE; or, terminating the process.

3. The method of claim 1, wherein said adjusting comprises modifying and/or complementing.

4. A method for implementing control by a border/packet gateway control system, comprising:

setting a control policy in the border/packet gateway control system for controlling bearer resources;

obtaining network resource information, generating a service decision related to IP network interconnecting according to the control policy and the network resource information, wherein the control policy comprises operation demands from an operator;

performing IP network interconnecting according to the service decision;

wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);

said obtaining network resource information and generating the service decision according to the control policy and the network resource information comprises:

sending, by the BGCFE/PGCFE, a resource request of the IP network interconnecting to the PDFE;

requesting, by the PDFE, the TRCFE to allocate appropriate network resources; feeding back, by the TRCFE, the network resource information to the PDFE;

generating, by the PDFE, the service decision related to IP network interconnecting services according to the control policy and the network resource information;

said sending the resource request of the IP network interconnecting to the PDFE comprises:

sending, by the BGCFE/PGCFE, service control information related to IP network interconnecting containing information of the BGFE/PGFE to the PDFE;

said performing IP network interconnecting according to the service decision comprises:

adjusting, by the PDFE, the service control information according to the service decision;

forwarding, by the PDFE, the adjusted service control information to the BGFE/PGFE;

performing, by the BGFE/PGFE, IP network interconnecting according to the adjusted service control information.

5. The method of claim 4, further comprising:

before sending the adjusted service control information to the BGFE/PGFE, sending, by the PDFE, the adjusted service control information to the BGCFE/PGCFE;

proceeding to implement said sending if the PDFE receives an acknowledgement from the BGCFE/PGCFE; otherwise, re-requesting, by the PDFE, the TRCFE to allocate appropriate network resources; feeding back, by the TRCFE, the network resource information to the PDFE; or, terminating the process.

6. The method of claim 4, wherein said adjusting comprises modifying and/or complementing.

7. A method for implementing control by a border/packet gateway control system, comprising:

setting a control policy in the border/packet gateway control system for controlling bearer resources;

obtaining network resource information, generating a service decision related to IP network interconnecting according to the control policy and the network resource information, wherein the control policy comprises operation demands from an operator;

performing IP network interconnecting according to the service decision;
wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);
said obtaining network resource information and generating the service decision according to the control policy and the network resource information comprises:
sending, by the BGCFE/PGCFE, a resource request of the IP network interconnecting to the PDFE;
requesting, by the PDFE, the TRCFE to allocate appropriate network resources; feeding back, by the TRCFE, the network resource information to the PDFE;
generating, by the PDFE, the service decision related to IP network interconnecting services according to the control policy and the network resource information;
setting mapping relationships of call models in the PDFE;
before performing IP network interconnecting according to the service decision,
converting, by the PDFE, the call models of the BGCFE/PGCFE to the call models of the BGFE/PGFE according to the mapping relationships of call models.

8. A method for implementing control by a border/packet gateway control system, comprising:
setting a control policy in the border/packet gateway control system for controlling bearer resources;
obtaining network resource information, generating a service decision related to IP network interconnecting according to the control policy and the network resource information, wherein the control policy comprises operation demands from an operator;
performing IP network interconnecting according to the service decision;
wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);
said obtaining network resource information and generating the service decision according to the control policy and the network resource information comprises:
sending, by the BGCFE/PGCFE, a resource request of the IP network interconnecting to the PDFE;
requesting, by the PDFE, the TRCFE to allocate appropriate network resources; feeding back, by the TRCFE, the network resource information to the PDFE;
generating, by the PDFE, the service decision related to IP network interconnecting services according to the control policy and the network resource information;
said sending an IP network interconnecting request to the PDFE comprises:
sending, by the BGCFE/PGCFE, a decision request to the PDFE;
said performing IP network interconnecting according to the service decision comprises:
sending, by the PDFE, the service decision to the BGCFE/PGCFE;
adjusting, by the BGCFE/PGCFE, the service control information according to the service decision;
choosing, by the BGCFE/PGCFE, a BGFE/PGFE;
sending, by the BGCFE/PGCFE, the adjusted service control information to the BGFE/PGFE;
performing, by the BGFE/PGFE, IP network interconnecting according to the adjusted service control information.

9. The method of claim 8, wherein said adjusting comprises modifying and/or complementing.

10. A method for implementing control by a border/packet gateway control system, comprising:
setting a control policy in the border/packet gateway control system for controlling bearer resources;
obtaining network resource information, generating a service decision related to IP network interconnecting according to the control policy and the network resource information, wherein the control policy comprises operation demands from an operator;
performing IP network interconnecting according to the service decision;
wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);
said obtaining network resource information and generating the service decision according to the control policy and the network resource information comprises:
sending, by the BGCFE/PGCFE, a resource request of the IP network interconnecting to the PDFE;
requesting, by the PDFE, the TRCFE to allocate appropriate network resources; feeding back, by the TRCFE, the network resource information to the PDFE;
generating, by the PDFE, the service decision related to IP network interconnecting services according to the control policy and the network resource information;
said sending an IP network interconnecting request to the PDFE comprises:
sending, by the BGCFE/PGCFE, a decision request to the PDFE;
said performing IP network interconnecting according to the service decision comprises:
adjusting, by the PDFE, the service control information according to part of the service decision;
choosing, by the PDFE, a BGFE/PGFE;
sending, by the PDFE, the adjusted service control information to the BGFE/PGFE;
sending, by the PDFE, the rest of the service decision and information of the BGFE/PGFE to the BGCFE/PGCFE;
adjusting, by the BGCFE/PGCFE, the service control information according to the rest of the service decision;
sending, by the BGCFE/PGCFE, the adjusted service control information to the BGFE/PGFE;
performing, by the BGFE/PGFE, IP network interconnecting according to the adjusted service control information.

11. The method of claim 10, wherein said adjusting comprises modifying and/or complementing.

12. A method for implementing control by a border/packet gateway control system, comprising:
setting a control policy in the border/packet gateway control system for controlling bearer resources;
obtaining network resource information, generating a service decision related to IP network interconnecting according to the control policy and the network resource information, wherein the control policy comprises operation demands from an operator;

performing IP network interconnecting according to the service decision;

wherein the border/packet gateway control system comprises a Border Gateway Control Function Entity/Packet Gateway Control Function Entity (BGCFE/PGCFE), a Policy Decision Function Entity (PDFE), a Transport Resource Control Function Entity (TRCFE), and a Border Gateway Function Entity/Packet Gateway Function Entity (BGFE/PGFE);

said obtaining network resource information and generating the service decision according to the control policy and the network resource information comprises:

sending, by the BGCFE/PGCFE, a resource request of the IP network interconnecting to the PDFE;

requesting, by the PDFE, the TRCFE to allocate appropriate network resources; feeding back, by the TRCFE, the network resource information to the PDFE;

generating, by the PDFE, the service decision related to IP network interconnecting services according to the control policy and the network resource information;

said sending an IP network interconnecting request to the PDFE comprises:

sending, by the BGCFE/PGCFE, a decision request containing information of the BGFE/PGFE to the PDFE;

said performing IP network interconnecting according to the service decision comprises:

adjusting, by the PDFE, the service control information according to part of the service decision;

sending, by the PDFE, the adjusted service control information to the BGFE/PGFE;

sending, by the PDFE, the rest of the service decision to the BGCFE/PGCFE;

adjusting, by the BGCFE/PGCFE, the service control information according to the rest of the service decision; and sending, by the BGCFE/PGCFE, the adjusted service control information to the BGFE/PGFE;

performing, by the BGFE/PGFE, IP network interconnecting according to the adjusted service control information.

13. The method of claim 12, wherein said adjusting comprises modifying and/or complementing.

14. A border/packet gateway control system, comprising:
a Border Gateway Control Function Entity/Packet Gateway Control Function Entity (BGCFE/PGCFE), configured for providing control of IP network interconnecting services from the application level, sending an IP network interconnecting request and service control information;
a Policy Decision Function Entity (PDFE), configured for receiving the IP network interconnecting request and the service control information from the BGCFE/PGCFE, sending a resource request, receiving network resource information, generating a service decision related to IP network interconnecting according to a preset control policy and the network resource information and sending the service control information, wherein the preset control policy comprises operation demands from an operator;
a Transport Resource Control Function Entity (TRCFE), configured for receiving the resource request from the PDFE, sending the network resource information to the PDFE; and
a Border Gateway Function Entity/Packet Gateway Function Entity (BGFE/PGFE), configured for receiving the service control information from the PDFE, and performing IP network interconnecting;
the BGCFE/PGCFE is further configured for choosing the BGFE/PGFE, and appending information of the BGFE/PGFE into the service control information;
the PDFE is further configured for adjusting the service control information or not before sending the service control information.

15. A border/packet gateway control system, comprising:
a Border Gateway Control Function Entity/Packet Gateway Control Function Entity (BGCFE/PGCFE), configured for providing control of IP network interconnecting services from the application level, sending an IP network interconnecting request and service control information;
a Policy Decision Function Entity (PDFE), configured for receiving the IP network interconnecting request and the service control information from the BGCFE/PGCFE, sending a resource request, receiving network resource information, generating a service decision related to IP network interconnecting according to a preset control policy and the network resource information and sending the service control information, wherein the preset control policy comprises operation demands from an operator;
a Transport Resource Control Function Entity (TRCFE), configured for receiving the resource request from the PDFE, sending the network resource information to the PDFE; and
a Border Gateway Function Entity/Packet Gateway Function Entity (BGFE/PGFE), configured for receiving the service control information from the PDFE, and performing IP network interconnecting;
the PDFE is further configured for choosing the BGFE/PGFE and adjusting the service control information or not before sending the service control information.

* * * * *

UNITED STATES PATENT AND TRADEMARK OFFICE
CERTIFICATE OF CORRECTION

| | |
|---|---|
| PATENT NO. | : 7,881,317 B2 |
| APPLICATION NO. | : 11/680234 |
| DATED | : February 1, 2011 |
| INVENTOR(S) | : Yangbo Lin |

It is certified that error appears in the above-identified patent and that said Letters Patent is hereby corrected as shown below:

In the Claims:

Column 16, Line 47, Claim 10 (Application dated 2/28/07, Page 39, Line 1, Claim 19): After "BGFE/PGFE" insert as a new paragraph --meanwhile--.

Column 17, Line 30, Claim 12 (Application dated 2/28/07, Page 40, Line 3, Claim 21): After "BGFE/PGFE" insert as a new paragraph --meanwhile--.

Signed and Sealed this
Twenty-ninth Day of March, 2011

David J. Kappos
*Director of the United States Patent and Trademark Office*